United States Patent Office 3,141,714
Patented July 21, 1964

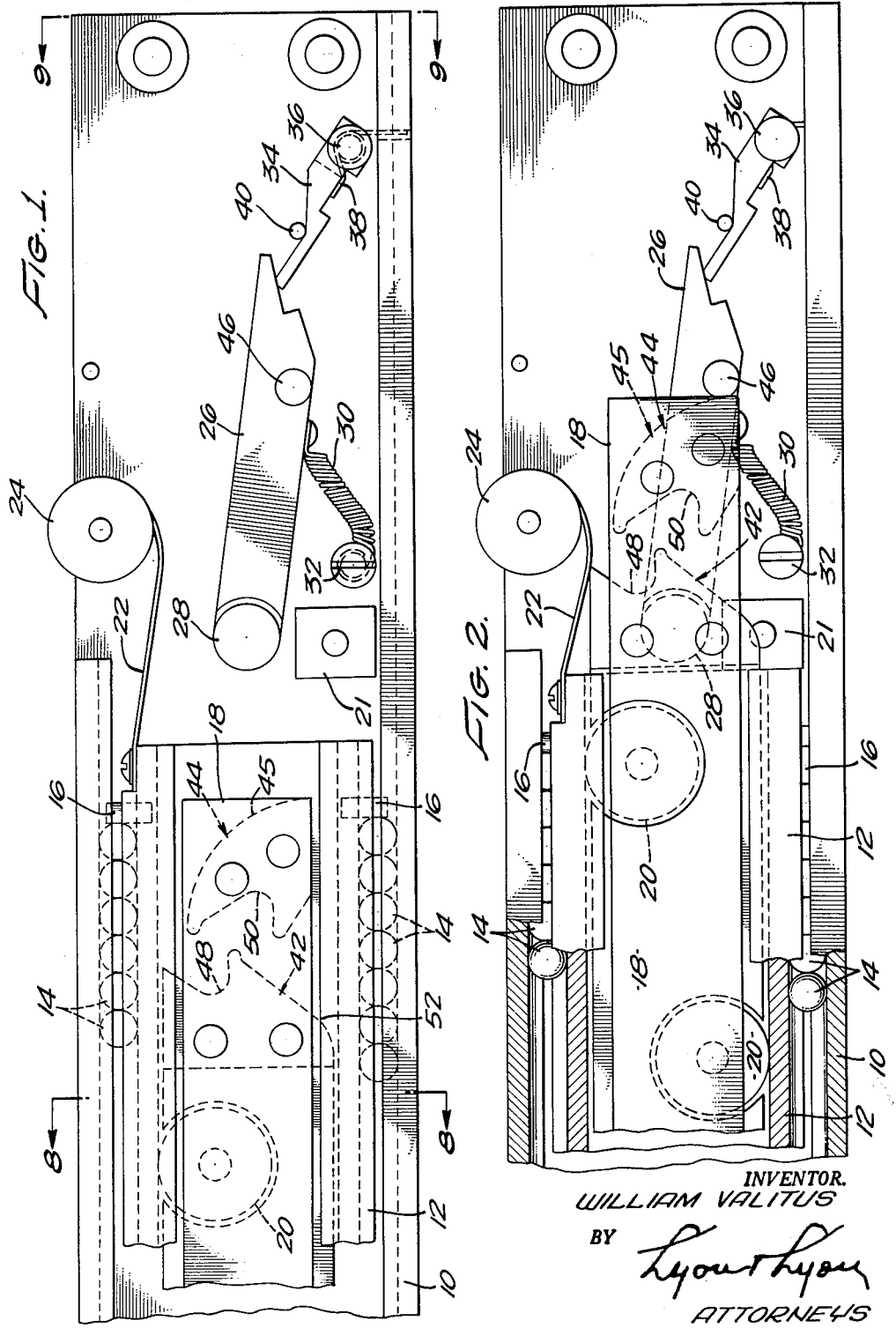

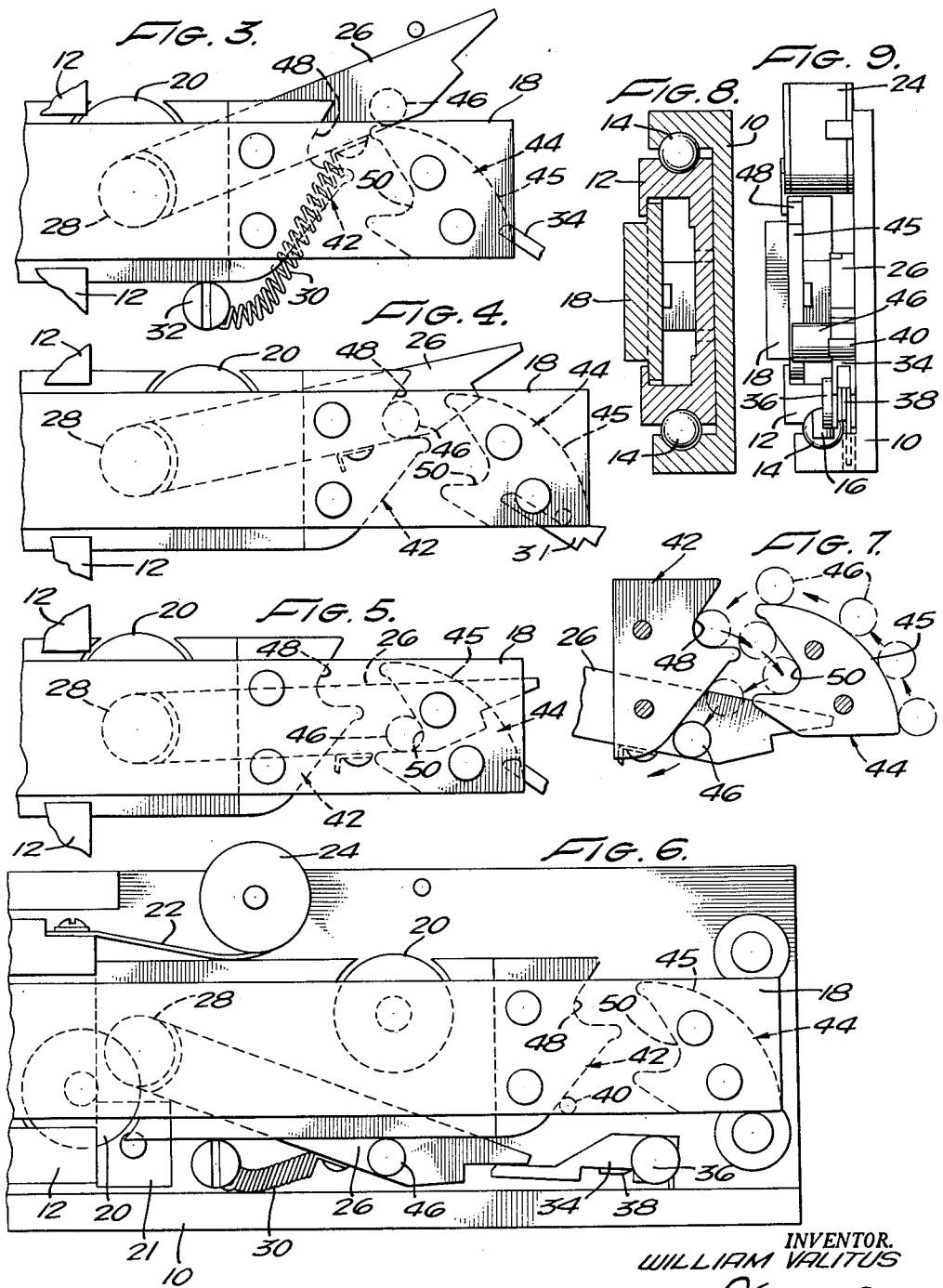

3,141,714
REAR LOCK STOP MECHANISM
William Valitus, Buena Park, Calif., assignor to Jonathan Manufacturing Company, Fullerton, Calif., a corporation of California
Filed June 23, 1961, Ser. No. 119,171
1 Claim. (Cl. 312—348)

This invention relates to an improved rear lock stop mechanism for drawers and the like.

In the mounting of electronic equipment such as telemetering devices in a cabinet, it is common practice to support same on a sliding member secured by intermediate members to a stationary member within the cabinet permitting the equipment to be pulled out of the cabinet in much the same manner as a drawer.

It is an object of this invention to provide means preventing slamming shut the slide mechanism with the resultant injury to the delicate electronic equipment.

It is a further object of this invention to provide a means whereby the slide mechanism cannot assume a closed position from an open position directly without following a set pattern of movement avoiding too rapid shutting thereof.

Other objects and advantages will be readily apparent from the following description.

In the drawings:

FIGURE 1 is a fragmentary side elevation of a device embodying this invention with the intermediate member partially retracted and the inner member partially retracted.

FIGURE 2 is a view similar to FIGURE 1 with the intermediate member fully retracted and the inner member partially retracted.

FIGURE 3 is a similar view showing the camming of the locking lever.

FIGURE 4 is a similar view with the inner member fully retracted.

FIGURE 5 is a similar view illustrating the locking lever in its locking position.

FIGURE 6 is a similar view illustrating release of the locking lever.

FIGURE 7 is a diagrammatic view illustrating the movement of the locking lever stop lug.

FIGURE 8 is a section taken along line 8—8 of FIGURE 1.

FIGURE 9 is a view taken along line 9—9 of FIGURE 1.

While only one set of support elements is illustrated and only one set will be described, it is readily apparent that a pair of sets are to be secured on either side of an electronic component to be stored in a suitable cabinet.

The stationary channel member 10 is fixed to an interior wall of a cabinet. Nested within channel of member 10 is the intermediate channel member 12.

The inner faces of member 10 and outer opposed faces of member 12 are grooved to receive ball bearings 14. The ball bearings in turn are held by pins 16 on the intermediate channel 12 and similar pins (not shown) in channel 10 adjacent the leftmost extremity thereof (not shown in FIGURE 1). Thus the intermediate member 12 is free to slide in stationary member 10 to the left in FIGURE 1 until the ball bearings form a stop by engaging both the pins on the stationary member 10 and intermediate member 12.

The inner member 18 is suitably secured to the electronic component being supported and is nested within intermediate channel 12. The inner member has a series of bearings 20 mounted within recesses formed within the flanged outer face of the member. The bearings in this embodiment comprise a stationary circular race and a rotatable outer ring with ball bearings between the two.

A stop similar to that described in copending application Serial No. 48,995, filed August 11, 1960, in behalf of John C. Meyer, and entitled "Quick Disconnect Slide for Drawers, Shelves, and the Like," is utilized to limit movement to the left in FIGURE 1 of the inner member 18 with respect to the intermediate member 12.

This invention is directed to the stop and lock mechanism at the innermost extremity of members 10 and 18 hereinafter described.

The stationary channel 10 is provided with a stop 21 which is abutted by intermediate member 12 limiting its movement to the right in FIGURE 1. A leaf spring 22 has one end fixed to intermediate slide 12 and the other end coiled around a spring loaded cylinder 24 mounted upon stationary channel 10 beyond the limit of movement of intermediate channel 12, which spring maintains a constant pull tending to draw the intermediate slide 12 against stop 21.

Also mounted within stationary channel 10 is a locking lever 26 pivotally mounted at 28. A spring 30 having one end attached to the locking lever and the other to stationary support 10 as at 32 resists counter clockwise pivoting of lever 26. A yielding stop 34 is pivotally mounted to the stationary support 10 as at 36 and is urged by spring 38 against pin 40 on support 10.

The inner member 18 at its innermost extremity has a pair of cam elements 42 and 44 mounted thereon and spaced from one another adapted to contact locking lug 46 mounted upon locking lever 26 in the path of the cams.

Thus, after the intermediate channel 12 has contacted stop 21 and hence terminated its movement into the cabinet, the inner member 18 which is longer continues to move to the right in FIGURE 1 until cam surface 45 on cam element 44 contacts locking lug 46 as seen in FIGURE 2. Further movement of member 18 pivots locking lever 26 counterclockwise with the lug 46 following the path shown in FIGURE 7 until same comes into groove 48 of cam element 42 (see FIGURE 4), preventing further movement of member 18 which is not yet fully within the cabinet or in the closed position.

Member 18 is then drawn outwardly and lug 46 moves from groove 48 into groove 50 in cam element 44 (see FIGURE 5), preventing further movement of member 18 in this direction.

The inner slide 18 is then moved into the cabinet fully with cam surface 42 engaging locking lug 46 and depressing locking lever 26 against spring 38 (see FIGURE 6), which subsequently returns same to the normal position in the path of cam surface 45 when the channel members are pulled out.

Thus, the sequence of steps outlined above must be followed and completed in the sequence described to get the component fully within the cabinet preventing possible damage to electrical connectors and the like at the back of the component mounted upon inner slide member 18.

While what hereinbefore has been described is the preferred embodiment of this invention it is readily apparent that alterations and modifications can be resorted to without departing from the scope of this invention and such alterations and modifications are intended to be included within the scope of the appended claim.

I claim:

A rear stop mechanism for drawers and the like mounted for sliding movement in a stationary structure, said mechanism being of the type having a stationary channeled element secured to said structure and at least one slidable element nested therein for movement parallel thereto and secured to said drawer comprising: a pivotal locking lever mounted upon one of said elements, a lock lug carried upon said lever, a pair of spaced apart cam members rigidly mounted upon the other element, each member having a locking groove therein, the first of said cam elements pivoting said locking lever to a position wherein said lock lug enters the locking groove on the second cam member terminating rearward travel of said slidable element and said drawer in one direction, said locking groove upon said first cam member being positioned in the path of said lock lug upon reversal of the direction of movement of said slide member and said drawer terminating further forward movement thereof, said second cam member further pivoting said locking lever to move said lock lug out of the path upon again reversing the direction of movement of said drawer and said slide member to a rearward direction, and yieldable means urging said lock lever to its initial position, said yieldable means and said pair of spaced apart cam elements being arranged to keep said lock lug out of the path of said locking grooves upon subsequent forward movement of said slide member and said drawer.

References Cited in the file of this patent

UNITED STATES PATENTS

| | | |
|---|---|---|
| 2,654,363 | Simpson | Oct. 6, 1953 |
| 2,817,554 | Hasselmark | Dec. 24, 1957 |
| 2,823,090 | Roehm | Feb. 11, 1958 |

FOREIGN PATENTS

| | | |
|---|---|---|
| 855,896 | France | Feb. 26, 1940 |